(12) United States Patent
Miyaji et al.

(10) Patent No.: US 12,281,604 B2
(45) Date of Patent: Apr. 22, 2025

(54) REMOVAL DETERMINATION DEVICE FOR EXHAUST GAS PURIFICATION DEVICE

(71) Applicant: TOYOTA JIDOSHA KABUSHIKI KAISHA, Toyota (JP)

(72) Inventors: Kazuya Miyaji, Okazaki (JP); Teruhiko Miyake, Suntou-gun (JP); Tomoyuki Tsuji, Nagakute (JP); Yusuke Joh, Toyota (JP); Yoshifumi Matsuda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/451,947

(22) Filed: Aug. 18, 2023

(65) Prior Publication Data

US 2024/0077011 A1    Mar. 7, 2024

(30) Foreign Application Priority Data

Sep. 5, 2022  (JP) ................. 2022-140814

(51) Int. Cl.
  *F01N 11/00*    (2006.01)
(52) U.S. Cl.
  CPC ........ *F01N 11/002* (2013.01); *F01N 2550/24* (2013.01); *F01N 2560/06* (2013.01); *F01N 2900/1404* (2013.01)
(58) Field of Classification Search
  CPC .............. F01N 11/002; F01N 2550/24; F01N 2560/06; F01N 2900/1404; F01N 11/00
  See application file for complete search history.

(56) References Cited

U.S. PATENT DOCUMENTS

| 6,523,341 | B1 * | 2/2003 | Rumpsa | F02D 41/064 60/284 |
|---|---|---|---|---|
| 2008/0041035 | A1 * | 2/2008 | Sawada | F01N 13/009 60/277 |
| 2009/0210129 | A1 * | 8/2009 | Leprieur | F01N 11/002 701/102 |
| 2010/0050608 | A1 * | 3/2010 | Jayachandran | F01N 11/005 60/286 |
| 2010/0162691 | A1 * | 7/2010 | Holmen | F01N 11/002 60/299 |

(Continued)

FOREIGN PATENT DOCUMENTS

| JP | 2008-121509 A | 5/2008 |
|---|---|---|
| JP | 2012062811 A * | 3/2012 |
| WO | WO 2020/235501 A1 | 11/2020 |

*Primary Examiner* — Matthew T Largi
(74) *Attorney, Agent, or Firm* — Oblon, McClelland, Maier & Neustadt, L.L.P.

(57) ABSTRACT

A removal determination device that accurately determines a removal of an exhaust gas purification device from an exhaust pipe. The removal determination device comprises: an input temperature sensor detecting a temperature at an upstream side of casing; an output temperature sensor detecting a temperature at a downstream side of the casing; an engine stop time collector measuring a time period from an inactivation of an engine to a startup of the engine; and a determiner determining a presence of the exhaust gas purifying device based on the input temperature and the output temperature, in a case that the time period is equal to or longer than a predetermined time.

6 Claims, 7 Drawing Sheets

(56) References Cited

U.S. PATENT DOCUMENTS

| | | | |
|---|---|---|---|
| 2011/0106392 A1* | 5/2011 | Verner | F01N 3/101 |
| | | | 701/101 |
| 2011/0143449 A1* | 6/2011 | Lana | G01M 15/102 |
| | | | 422/82.12 |
| 2015/0033837 A1* | 2/2015 | Niemeyer | F01N 11/002 |
| | | | 73/114.75 |
| 2016/0265413 A1* | 9/2016 | Willimowski | F01N 11/005 |
| 2018/0283248 A1* | 10/2018 | Upadhyay | F02D 41/1446 |

* cited by examiner

REMOVAL DETERMINATION DEVICE FOR EXHAUST GAS PURIFICATION DEVICE

CROSS-REFERENCE TO RELATED APPLICATIONS

The present disclosure claims the benefit of Japanese Patent Application No. 2022-140814 filed on Sep. 5, 2022 with the Japanese Patent Office, the disclosure of which is incorporated herein by reference in its entirety.

BACKGROUND

Field of the Invention

Embodiments of the present disclosure relate to the art of an apparatus for determining whether or not an apparatus for purifying exhaust gas of an engine is removed from an exhaust pipe.

Discussion of the Related Art

JP-A-2008-121509 discloses an exhaust system including an outer cylinder communicating with an exhaust pipe, an inner cylinder disposed on a central axial line of the outer cylinder at a predetermined distance from an inner surface of the outer cylinder, an HC adsorbent provided between the outer cylinder and the inner cylinder, and a switching valve disposed upstream of the inner cylinder. In this exhaust system, the upstream of the inner cylinder is closed by the switching valve, so that the exhaust gas flows toward the downstream only from the bypass flow path extending between the outer cylinder and the inner cylinder. Further, by opening the upstream side of the inner cylinder by the switching valve, the exhaust gas flows from the bypass flow path and the hollow portion of the inner cylinder (hereinafter, referred to as a normal flow path) toward downstream.

JP-A-2008-121509 describes a diagnostic apparatus for diagnosing a failure of the switching valve. The diagnosis device includes a first temperature sensor provided on the downstream side of the inner cylinder, and a second temperature sensor provided on the upstream portion of the bypass flow path. Specifically, the diagnosis apparatus is configured to diagnose a failure of the switching valve based on whether or not a difference between a first temperature area, which is an integrated value of the temperature detected by the first temperature sensor after starting the engine, and a second temperature area, which is an integrated value of the temperature detected by the second temperature sensor, is a difference corresponding to an actuating command of the switching valve.

If a vehicle is driven only a short period of-time repeatedly in a state in which the exhaust gas flows through only one of the bypass flow path and the normal flow path, there is a possibility that the initial temperature detected by the sensor provided in one of those flow paths would be high and the failure of the switching valve is erroneously determined. Therefore, the diagnosis apparatus described in JP-A-2008-121509 is configured to diagnose a failure of the switching valve only when the engine water temperature at the startup of engine is the threshold value or less, a reduction in the engine water temperature from the termination of the previous trip is larger than the threshold value, and the integrated intake air during the previous trip is larger than the threshold value.

The order in which the temperature sensors described in JP-A-2008-121509 receive the heat of the exhaust gas is different between the case where the switching valve is opened and the case where the switching valve is closed. Therefore, it is possible to determine whether or not the switching valve is inoperable in accordance with a relation (that is, the temperature difference) between the first temperature area based on the temperature detected by the first temperature sensor and the second temperature area based on the temperature detected by the second temperature sensor, an exhaust purification device such as a gasoline-particulate filter (hereinafter referred to as a GPF) provided in an exhaust pipe may be intentionally removed from the exhaust pipe due to theft or the like. Even when the exhaust gas purification device is removed from the exhaust pipe, the flow direction of the exhaust gas will not change regardless of the presence or absence of the exhaust gas purification device. Therefore, the failure diagnosis device described in JP-A-2008-121509 may not be employed to determine a removal of the purification device as it is. Therefore, it is required to develop an apparatus for accurately determining that the exhaust gas purification device has been removed.

SUMMARY

Aspects of embodiments of the present disclosure have been conceived noting the foregoing technical problems, and it is therefore an object of the present disclosure to provide a removal determination device for an exhaust gas purification device capable of improving the determination accuracy of removal of an exhaust gas purification device from an exhaust pipe.

According to the exemplary embodiment the present disclosure, there is provided a removal determination device for an exhaust gas purification device that determines a presence of the exhaust gas purification device in a casing formed on an exhaust pipe of an engine, comprising: an input temperature sensor that detects a temperature at an upstream side of the casing; an output temperature sensor that detects a temperature at a downstream side of the casing; and a controller that determines the presence of the exhaust gas purifying device in the casing. In order to achieve the above-explained objective, according to the exemplary embodiment of the present disclosure, the controller comprises: an engine stop time collector that collects a time from a point at which the engine is stopped to a point at which the engine is started; and a determiner that determines the presence of the exhaust gas purifying device in the casing based on an input temperature detected by the input temperature sensor and an output temperature detected by the output temperature sensor, in a case that the time from the point at which the engine is stopped to the point at which the engine is started is equal to or longer than a predetermined time.

In a non-limiting embodiment, the controller may be configured to: calculate an integrated amount of an exhaust gas from a startup of the engine; and determine the presence of the exhaust gas purifying device in the casing by the determiner when the integrated amount of the exhaust gas is equal to or greater than a predetermined amount.

In a non-limiting embodiment, the controller may be further configured to obtain a predetermined integrated amount of the exhaust gas at which the input temperature is raised to or higher than a dew point temperature of moisture and the output temperature is decreased lower than the dew point temperature, in a case that the exhaust gas purification device is arranged in the casing. In addition, the predetermined amount may include the predetermined integrated amount.

In a non-limiting embodiment, the controller may be configured to determine the presence of the exhaust gas purifying device in the casing by the determiner when the input temperature is equal to or higher than a predetermined temperature.

In a non-limiting embodiment, the determiner may be configured to determine that the exhaust gas purification device is arranged in the casing in a case that a difference between the input temperature and the output temperature at a point when the integrated amount of the exhaust gas from the startup of the engine reaches a first determination value is equal to or greater than a first threshold value.

In a non-limiting embodiment, the determiner may be configured to determine that the exhaust gas purification device is arranged in the casing, in a case that a difference between: an integrated amount of the exhaust gas required to raise the input temperature to a first predetermined temperature from the startup of the engine; and an integrated amount of the exhaust gas required to raise the output temperature to the first predetermined temperature, is equal to or greater than a second threshold value.

In a non-limiting embodiment, the determiner may be configured to determine that the exhaust gas purification device is arranged in the casing, in a case that a difference between: an integrated amount of the exhaust gas required to raise the input temperature from a second predetermined temperature to a third predetermined temperature; and an integrated amount of the exhaust gas required to raise the output temperature from the second predetermined temperature to the third predetermined temperature, is equal to or greater than a third threshold value.

In a non-limiting embodiment, the determiner may be configured to determine that the exhaust gas purification device is arranged in the casing, in a case that a time change rate of the output temperature with respect to a time change rate of the input temperature at a point when the input temperature is raised to a fourth predetermined temperature is equal to or less than a fourth threshold value.

According to the present disclosure, in the case where the time from the stop of the engine until the start of the engine is equal to or longer than a predetermined time, it is determined whether or not the exhaust gas purification device for purifying the exhaust gas of the engine is present in the exhaust pipe based on the input temperature and the output temperature of the casing accommodating the exhaust gas purification device. Therefore, it is possible to determine the presence or absence of the exhaust gas purification device in the exhaust pipe from a state in which the temperature in the engine or the exhaust pipe is lowered. In addition, it is possible to prevent erroneous determination of the presence or absence of the exhaust purification device due to a change in the input temperature due to the thermal energy remaining in the engine or the exhaust pipe, a change in the output temperature due to the thermal energy remaining in the exhaust purification device, or the like.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

FIGS. 3A and 3B are graphs showing the results of verifying the relationship between the integrated air amount and the temperatures detected by the respective temperature sensors, in which FIG. 3A shows the verification results in a case in which a GPF is arranged in the exhaust pipe, and in which FIG. 3B shows the verification results in a case in which the GPF is not arranged in the exhaust pipe; and FIGS. 4A and 4B are graphs for comparing the manners of changes in the input temperature and the output temperature during the soak time, in which FIG. 4A shows the change in the input temperature and the output temperature in a case in which the engine is restarted in a short time, and in which FIG. 4B shows the change in the input temperature and the output temperature in a case in which the engine is restarted in a long time;

FIGS. 5A and 5B are graphs showing the results of verifying the relationship between the time rate of change in the integrated air amount and the time rate change in the input temperature and the output temperature, in which FIG. 5A shows the verification results of the case in which the GPF is arranged in the exhaust pipe, and in which FIG. 5B shows the verification results of the case in which the GPF is not arranged in the exhaust pipe;

DETAILED DESCRIPTION OF THE PREFERRED EMBODIMENT(S)

Embodiments of the present disclosure will now be explained with reference to the accompanying drawings. Note that the embodiments shown below are merely examples of the present disclosure, and do not limit the present disclosure.

Figure 1:
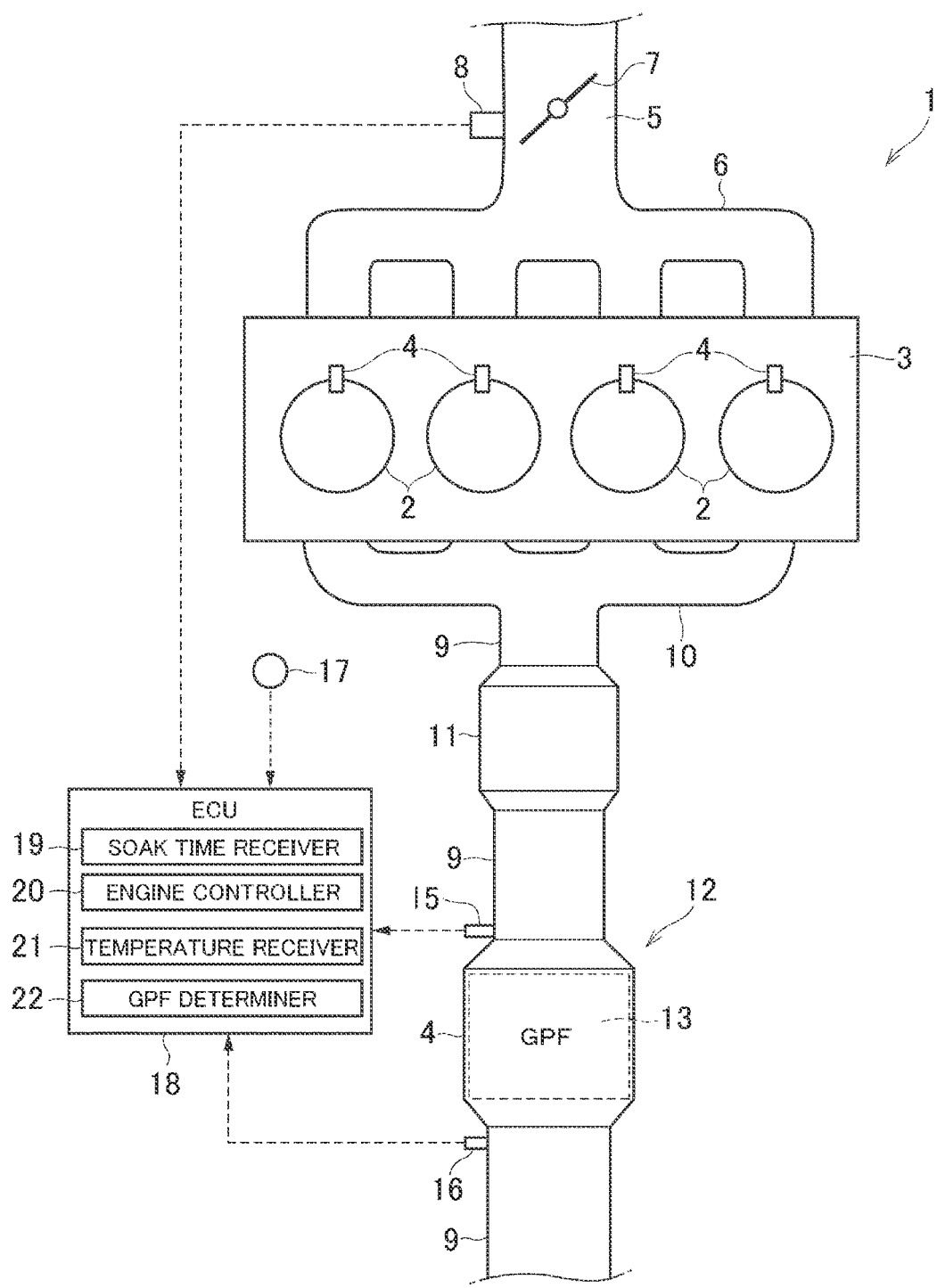
FIG. 1 is a schematic illustration showing an example of an exhaust gas purification device according to an embodiment of the present disclosure.

FIG. 1 schematically illustrates an example of an engine and an exhaust gas purifying apparatus to which a removal determination apparatus according to an embodiment of the present disclosure is applied. The engine 1 shown in FIG. 1 is configured to generate power by burning an air-fuel mixture such as gasoline or diesel, as the conventional engine. Specifically, in the engine 1, a plurality of cylinders 2 in which the air-fuel mixture is burnt are formed in the engine block 3. Each cylinder 2 is provided with an ignition plug 4 for igniting the air-fuel mixture.

An intake pipe 5 is connected to the engine block 3 via an intake manifold 6 to introduce air from outside. In addition to various members such as an air cleaner (not shown), the intake pipe 5 is provided with a throttle valve 7 to control an amount of air flowing through the intake pipe 5 in response to an operation of an accelerator by the driver. The intake pipe 5 is provided with a throttle opening sensor 8 to detect an opening degree of the throttle valve 7.

An exhaust pipe 9 is connected to the engine block 3 via an exhaust manifold 10 to discharge the exhaust gas generated as a result of burning the air-fuel mixture in each of the cylinders 2 to the outside of the vehicle.

The exhaust pipe 9 is provided with various devices for purifying unburned gases (carbon monoxide (CO) and hydrocarbons (HC)) and nitrogen oxides (NOx) contained in the exhaust gas and for capturing particulate matter. In the embodiment shown in FIG. 1, the exhaust pipe 9 is provided with a catalyst device 11 such as an oxidation catalyst (two-way catalyst) and a three-way catalyst to purify unburned gases and NOx, and a PM capturing device 12 arranged downstream of the catalyst device 11 to capture particulate matter.

In the embodiment of the present disclosure, a wall-flow type filter 13 is employed as the PM capturing device 12 which is an exhaust-gas purification device. Specifically, the PM capturing device 12 includes the filter 13 called a GPF (Gasoline Particulate Filter), in which a three-way catalyst is supported on the filter 13. Therefore, unburned gas and NOx contained in the exhaust gas discharged from the catalyst device 11 can be effectively purified by the PM capturing device 12. In the following explanation, the filter 13 will be simply referred to as the GPF 13.

The GPF 13 has an outer diameter substantially the same as an inner diameter of a casing 14 formed by expanding a diameter of a part of the exhaust pipe 9, and is inserted into the casing 14. That is, the casing 14 is connected to the exhaust pipe 9 so that all of the exhaust gas flowing to the casing 14 passes through the inside of the GPF 13.

In order to detect a temperature of the exhaust gas flowing into the GPF 13, an input temperature sensor 15 is provided between the catalyst device 11 and the GPF 13. In addition, an output temperature sensor 16 is provided downstream of the GPF 13 to detect a temperature of the exhaust gas flowing out of the GPF 13. In other words, the input temperature sensor 15 detects the temperature on the upstream side of the casing 14, and the output temperature sensor 16 detects the temperature on the downstream side of the casing 14.

The throttle opening sensor 8, the temperature sensors 15 and 16, and a soak timer 17 are connected to an electronic control unit (hereinafter referred to as the ECU) 18 corresponding to a "controller" in the embodiment of the present disclosure. The soak timer 17 is configured to measure an elapsed time (soak time) from a point at which the ignition is turned off.

As the conventional ECUs, the ECU 18 is mainly composed of a microcomputer, and is configured to determine the presence or absence of the GPF 13 based on an inputted signal, and a map, an arithmetic expression and so on stored in advance. Note that a signal from another sensor, such as a signal from a sensor that detects the engine-speed, may be inputted to the ECU 18.

The ECU 18 includes a soak time receiver 19, an engine controller 20, a temperature receiver 21, and a GPF determiner 22. Specifically, the soak time receiver 19 functions as an "engine stop time collector" that collects a time from a point at which the engine 1 is stopped to a point at which the engine 1 is started. In the embodiment of the present disclosure, the soak time measured by the soak timer 17 is transmitted to the soak time receiver 19.

The engine controller 20 is configured to control the start and stop of the engine 1, and in addition, to control the output of the engine 1 in accordance with a required driving force based on an accelerator operation amount or the like. The temperature receiver 21 is configured to receive the temperatures detected by the input temperature sensor 15 and the output temperature sensor 16, and output the temperatures to the GPF determiner 22. The GPF determiner 22 is configured to determine whether or not the GPF 13 is removed from the exhaust pipe 9 based on the temperature data inputted from the temperature receiver 21. In other words, it is configured to confirm the presence or absence of the GPF 13 in the exhaust pipe 9. The GPF determiner 22 corresponds to a "determiner" in the embodiment of the present disclosure.

Figure 2:
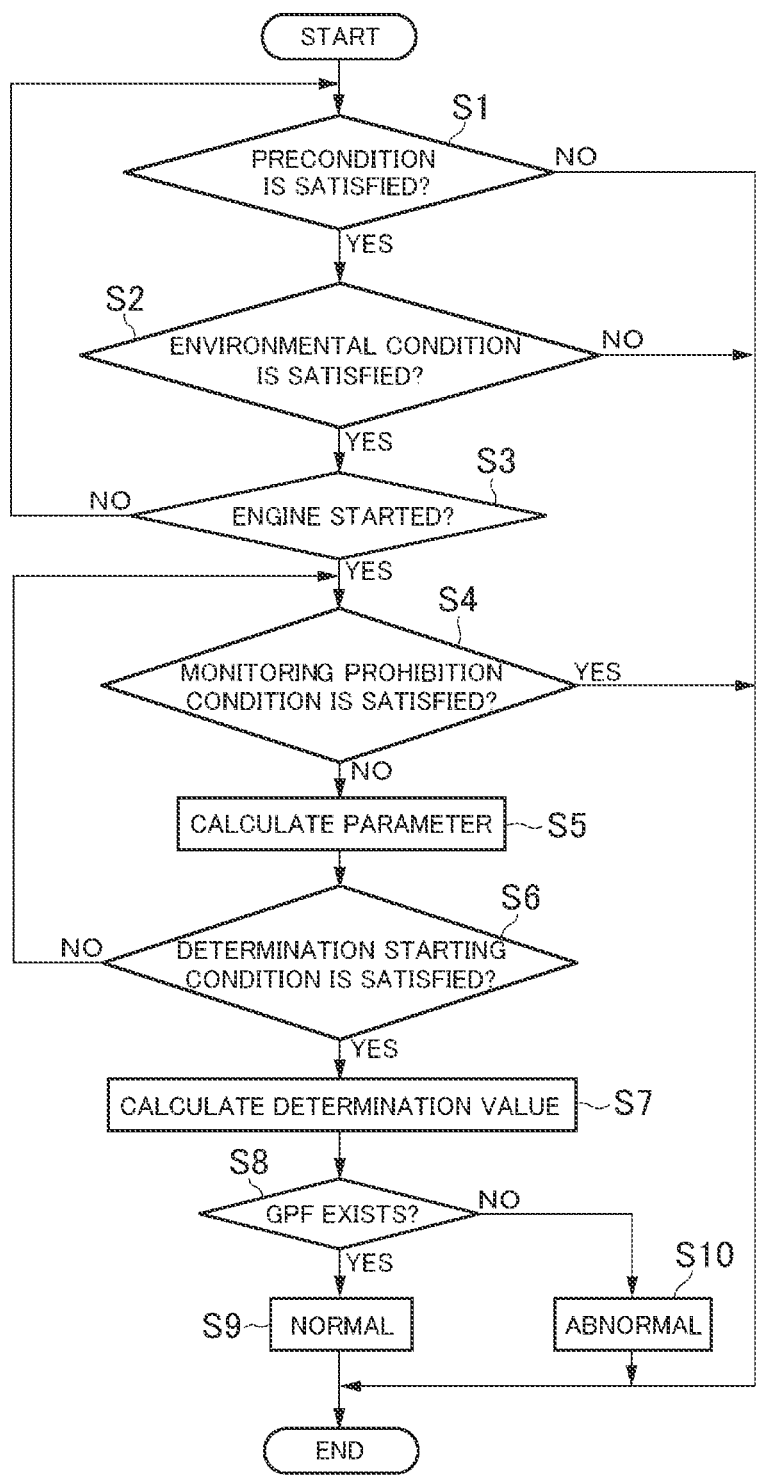
FIG. 2 is a flowchart showing an example of a routine executed by the determination device according to an embodiment of the present disclosure.

FIG. 2 is a flowchart for explaining an example of a control executed by the ECU 18. In the control example shown therein, when the engine 1 is started under the condition in which the temperature of the engine 1 is lower than the predetermined temperature, the presence or absence of the GPF 13 is determined. At step S1, it is determined whether or not a precondition for determining the presence or absence of the GPF 13 is satisfied. Specifically, at step S1, it is determined whether or not the soak time is equal to or longer than a predetermined period of time. The predetermined period of time is set to a period required for the temperatures of the engine 1 and the exhaust pipe 9 to drop to a temperature equivalent to the ambient temperature based on results of experiments and simulations. Given that the removal determination device according to the embodiment is applied to a hybrid vehicle that can be driven by a motor as another prime mover while stopping the engine 1, instead of the soak time, it may be determined at step S1 whether or not the elapsed time from the point at which the engine 1 was stopped is equal to or longer than a predetermined time. As described above, at step S1, it is determined whether or not the elapsed time from the point at which the engine 1 was stopped to the point at which the engine is started is equal to or longer than a predetermined period of time.

If the precondition for determining the presence or absence of the GPF 13 in the exhaust pipe 9 is not satisfied so that the answer of step S1 is NO, the routine returns. On the contrary, if the precondition for determining the presence or absence of the GPF 13 is satisfied so that the answer of step S1 is YES, the routine progresses to step S2 to determine whether an environmental condition for determining the presence or absence of the GPF 13 in the exhaust pipe 9 is satisfied. Specifically, at step S2, it is determined whether or not an ambient pressure is equal to or higher than a predetermined atmospheric pressure determined in advance according to laws and regulations.

If the environmental condition is not satisfied so that the answer of step S2 is NO, the routine returns. On the contrary, if the environmental condition is satisfied so that the answer of step S2 is YES, the routine progresses to the step S3 to determine whether or not the engine 1 is started. Such determination at step S3 may be made based on, for example, a signal transmitted from the engine controller 20 to the engine 1.

If the engine 1 is not started so that the answer of step S3 is NO, the routine returns to step S1, and the determination at step S3 is repeated until the engine 1 is started. On the contrary, if the engine 1 is started so that the answer of step S3 is YES, the routine progresses to step S4 to determine whether or not a monitoring prohibition condition where the temperature of the exhaust gas does not increase at a substantially constant (same) rate is satisfied. Therefore, for example, the monitoring prohibition condition is satisfied in the case where the engine 1 may stall or in the case where the output of the engine 1 is increasing at a predetermined rate or higher.

If the monitoring prohibition condition is satisfied so that the answer of step S4 is YES, the routine returns. On the contrary, if the monitoring prohibition condition is not satisfied so that the answer of step S4 is NO, the routine progresses to step S5 to perform calculations of the detected parameters.

In this example, the presence or absence of the GPF 13 in the exhaust pipe 9 is determined based on the temperatures detected by the input temperature sensor 15 and the output temperature sensor 16, and an integrated amount of the exhaust gas flowing through the GPF 13. The integrated amount of the exhaust gas delivered to GPF 13 may be calculated, for example, based on a detected value of the throttle opening sensor 8. In the following explanation, the integrated amount of the exhaust gas delivered to GPF 13 will also be referred to as an integrated air amount for the sake of convenience.

Figure 3A:
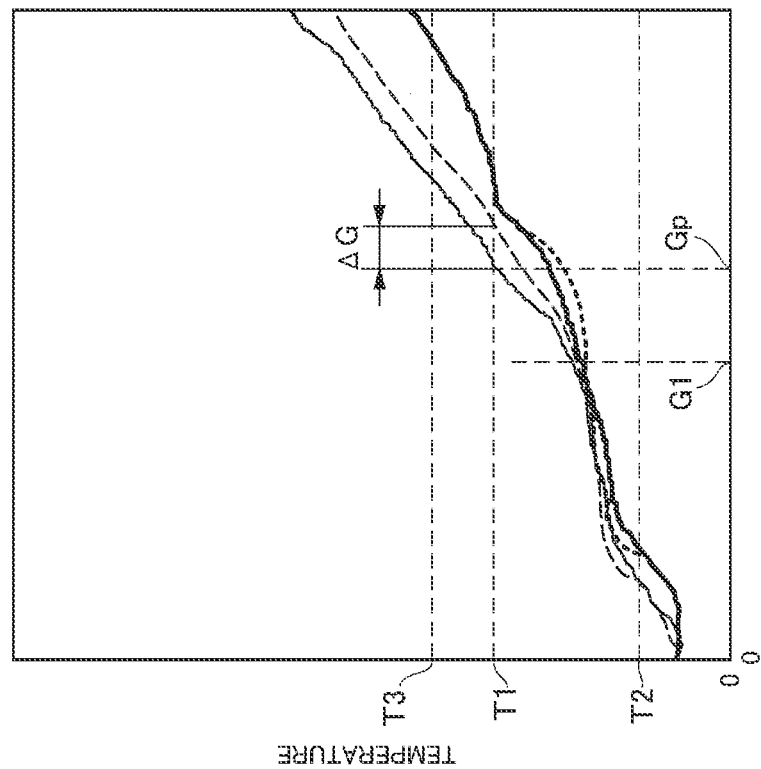

FIG. 3A shows a verification result of the relation between the integrated air amount and the temperatures detected by the temperature sensors 15 and 16 under the condition in which the GPF 13 is arranged in the exhaust pipe 9. On the other hand, FIG. 3B shows a verification result of the relation between the integrated air amount and the temperatures detected by the temperature sensors 15 and 16 under the condition in which the GPF 13 is not arranged in the exhaust pipe 9.

Figure 3B:
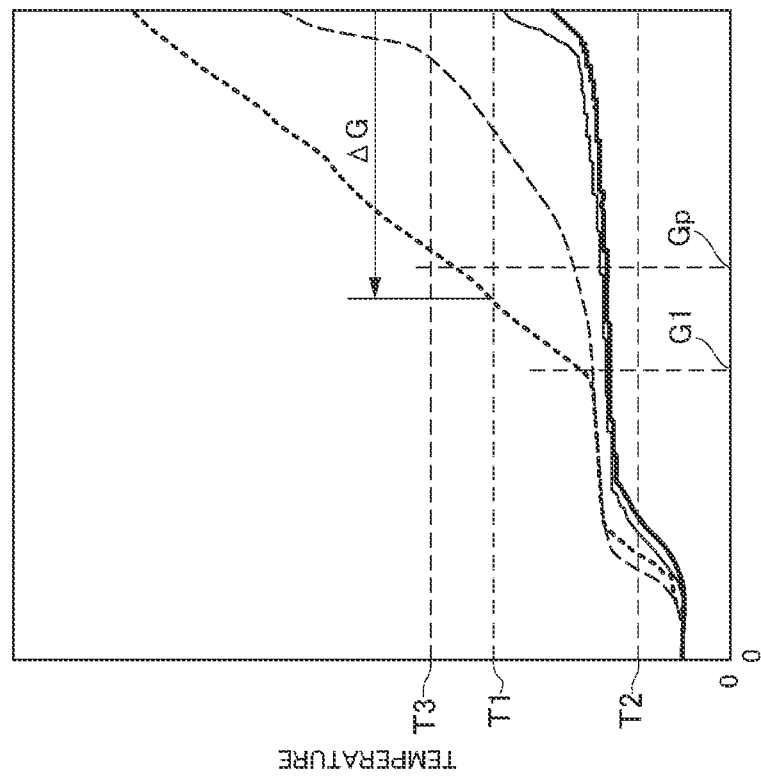

The verification shown in FIGS. 3A and 3B was conducted by running a test vehicle in line with the high-speed, high-acceleration test-cycle pattern (US06) of the Supplemental Federal Test Procedure (SFTP) and the Worldwide harmonized Light duty driving Test Procedure (WLTP). In the test pattern according to WLTP, the test vehicle was driven at a relatively slower speed than that in the test pattern according to US06. In FIG. 3A and FIG. 3B, the thick curve indicates the above-mentioned relation verified by operating the test vehicle in line with the test pattern according to US06, the thin curve indicates the above-mentioned relation verified by operating the test vehicle in line with the test pattern according to WLTP, the dashed line indicates the input temperature detected by the input temperature sensor 15, and the solid line indicates the output temperature detected by the output temperature sensor 16.

As shown in FIG. 3A, in the case in which the GPF 13 is arranged in the exhaust pipe 9, the difference between the input temperature and the output temperature is very small and substantially constant (stagnant) as long as the integrated air amount is equal to or less than a predetermined amount G1. In other words, the input temperature and the output temperature are stagnant. After the integrated air amount exceeds the predetermined amount G1, the input temperature begins to increase irrespective of the traveling pattern, but the output temperature remains constant. Specifically, the input temperature and the output temperature stagnate at the dew point temperature of water. In the case in which the GPF 13 is arranged in the exhaust pipe 9, the heat capacity of the exhaust pipe 9 is increased by the GPF 13. After the integrated air amount (thermal energy input to GPF 13) exceeds the predetermined amount G1, the input temperature starts to increase. However, because the GPF 13 absorbs the heat, the output temperature is still stagnant in this situation.

On the other hand, as shown in FIG. 3B, in the case in which the GPF 13 is not arranged in the exhaust pipe 9, the difference between the input temperature and the output temperature is small in both test patterns. Further, since the flow resistance of the exhaust gas is small, the exhaust gas containing a relatively large amount of moisture in the exhaust pipe 9 is quickly discharged. As a result, the input temperature and the output temperature rise without stagnation.

Therefore, in the control example, the presence or absence of the GPF 13 in the exhaust pipe 9 is determined based on the integrated air amount and the temperatures detected by the temperature sensors 15 and 16. Therefore, at step S5, the integrated air amount from the startup of the engine 1 is calculated.

At step S6, it is determined whether or not a determination starting condition is satisfied. Specifically, at step S6, it is determined whether or not it is in a condition in which the difference between the input temperature and the output temperature is increased significantly provided that the GPF 13 is arranged in the exhaust pipe 9. For example, as shown in FIGS. 3A and 3B, it is determined whether or not the integrated air amount is equal to or greater than a predetermined integrated air amount Gp, and whether or not the input temperature is equal to or higher than a predetermined temperature T1. More specifically, it is determined whether or not the integrated air amount becomes an amount possible to estimate that the input temperature is equal to or higher than the dew point temperature of moisture, and that the output temperature is lower than the dew point temperature of moisture. This integrated air amount corresponds to a "predetermined amount" or a "predetermined integrated amount" in the embodiment of the present disclosure.

If the determination starting condition is not satisfied so that the answer of step S6 is NO, the routine returns to step S4. On the contrary, if the determination starting condition is satisfied so that the answer of step S6 is YES, the routine progresses to step S7 to calculate a determination value for determining the presence or absence of the GPF 13 in the exhaust pipe 9.

Specifically, the difference between the input temperature and the output temperature in the predetermined integrated air amount Gp corresponding to the "first determination value" is calculated. To this end, the predetermined integrated air amount Gp is set to a value at which a difference between the input temperature and the output temperature is remarkably increased provided that the GPF 13 is arranged, and a difference between the input temperature and the output temperature is reduced remarkably provided that the GPF 13 is not arranged, based on a result of an experiment, a simulation, or the like. The predetermined integrated air amount Gp may be set to a different value from the value used for the determination at step S6.

At step S7, a difference $\Delta G$ between the integrated air amount required to raise the input temperature to the first predetermined temperature T1 and the integrated air amount required to raise the output temperature to the first predetermined temperature T1 may be calculated. Specifically, the first predetermined temperature T1 is set to a level at which, the difference $\Delta G$ between the integrated air amount required to raise the input temperature to the first predetermined temperature T1 and the integrated air amount required to raise the output temperature to the first predetermined temperature T1 is increased higher than a predetermined value provided that the GPF 13 is arranged in the exhaust pipe 9, and the difference $\Delta G$ is reduced to the predetermined value or less provided that the GPF 13 is not arranged in the exhaust pipe 9. The first predetermined temperature T1 may be determined in advance based on experimentation, simulations, and the like.

At step S7, the difference between the integrated air amount required to raise the input temperature from a second predetermined temperature T2 to a third predetermined temperature T3 and the integrated air amount required to raise the output temperature from the second predetermined temperature T2 to the third predetermined temperature T3 may also be calculated. Specifically, the second predetermined temperature T2 and the third predetermined temperature T3 are set to levels at which a difference between the integrated air amount required to raise the input temperature from the second predetermined temperature T2 to the third predetermined temperature T3 and the integrated air amount required to raise the output temperature from the second predetermined temperature T2 to the third predetermined temperature T3 is increased higher than a predetermined value provided that the GPF 13 is arranged in the exhaust pipe 9, and the difference between the integrated air amount required to raise the input temperature from the second predetermined temperature T2 to the third predetermined temperature T3 and the integrated air amount required to raise the output temperature from the second predetermined temperature T2 to the third predetermined temperature T3 provided that the GPF 13 is not arranged in the exhaust pipe 9 is reduced to the predetermined value or less. The second predetermined temperature T2 and the third predetermined temperature T3 may be determined in advance based on experimental or simulated data.

Thereafter, at step S8, it is determined whether or not the GPF 13 is arranged in the exhaust pipe 9 based on the determination value calculated at step S7. For example, in the case in which the difference (i.e., the determination value) between the input temperature and the output temperature at the predetermined integrated air amount Gp is calculated at step S7, it is determined at step S8 whether or not the determination value is equal to or greater than a predetermined first threshold value. If the determination value is equal to or greater than the first threshold value, it is determined that the GPF 13 is arranged in the exhaust pipe 9.

In the case in which a difference (i.e., a determination value) between the integrated air amount required to raise the input temperature to the first predetermined temperature T1 and the integrated air amount required to raise the output temperature to the first predetermined temperature T1 is calculated at step S7, it is determined whether or not the determination value is equal to or greater than a predetermined second threshold value. If the determination value is equal to or greater than the second threshold value, it is determined that the GPF 13 is arranged in the exhaust pipe 9.

In the case in which a difference (i.e., a determination value) between the integrated air amount required to raise the input temperature from the second predetermined temperature T2 to the third predetermined temperature T3 and the integrated air amount required to raise the output temperature from the second predetermined temperature T2 to the third predetermined temperature T3 is calculated at step S7, it is determined whether or not the determination value is equal to or greater than a predetermined third threshold value. If the determination value is equal to or greater than the third threshold value, it is determined that the GPF 13 is arranged in the exhaust pipe 9.

If the GPF 13 is arranged in the exhaust pipe 9 so that the answer of step S8 is YES, the routine progresses to step S9 to determine that the exhaust pipe 9 is functioning normally, and then returns. On the contrary, if the GPF 13 is not arranged in the exhaust pipe 9 so that the answer of step S8 is NO, the progresses to step S10 to determine that the exhaust pipe 9 is in an abnormal condition, and thereafter returns. In this case, the abnormality of the exhaust pipe 9 may be notified to the driver, and the operating condition of the engine 1 may be changed.

Figure 4A:
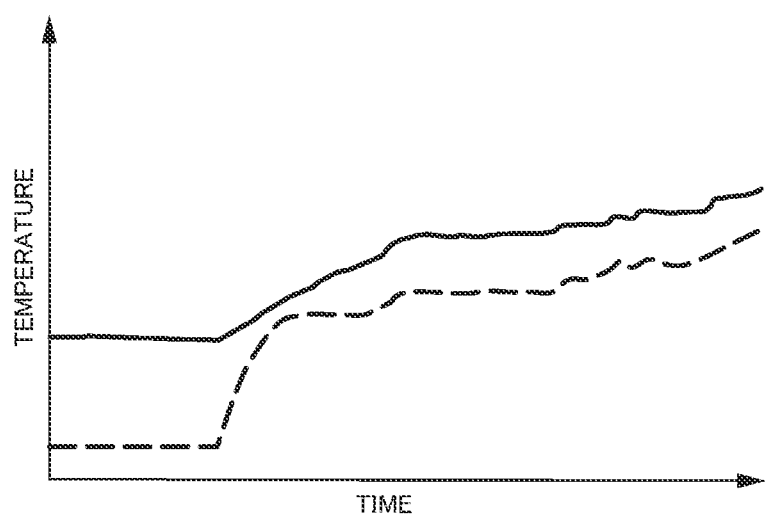
Figure 4B:
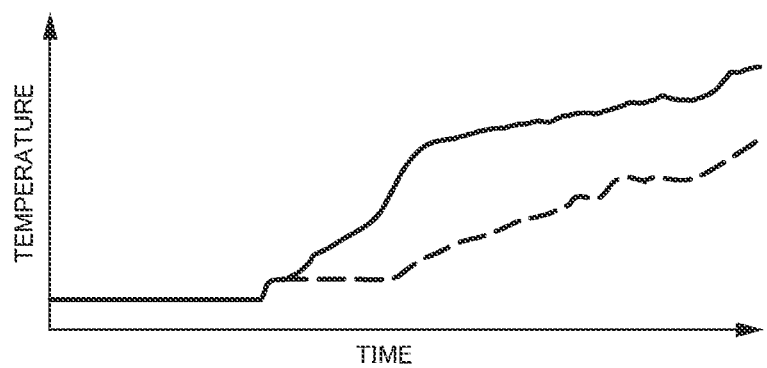

FIG. 4A shows an example in which the GPF 13 is arranged in the exhaust pipe 9 and the input temperature and the output temperature are measured in the case in which the engine 1 is restarted in a short time (that is, the soak time is shorter than a predetermined time), and FIG. 4B shows an example in which the GPF 13 is arranged in the exhaust pipe 9 and the input temperature and the output temperature are measured in the case in which the engine 1 is restarted after a long time (that is, the soak time is equal to or longer than a predetermined time). In FIGS. 4A and 4B, solid lines represent the input temperature, and broken lines represent the output temperature.

As shown in FIG. 4A, if the engine 1 is restarted in a short time, the initial temperature of the GPF 13 is high and hence the temperature of the exhaust gas flowing through the GPF 13 is raised by restarting the engine 1. As a consequence, the difference between the input temperature and the output temperature at the predetermined integrated air amount Gp becomes small. Otherwise, the difference between the integrated air amount required to raise the output temperature to the first predetermined temperature T1 and the integrated air amount required to raise the input temperature to the first predetermined temperature T1 is reduced. Otherwise, the difference between the integrated air amount required to raise the input temperature from the second predetermined temperature T2 to the third predetermined temperature T3 and the integrated air amount required to raise the output temperature from the second predetermined temperature T2 to the third predetermined temperature T3 is reduced. Therefore, there is a possibility of erroneously determining that GPF 13 is not arranged in the exhaust pipe 9.

On the other hand, if the engine 1 is restarted after a long time as shown in FIG. 4B, the initial temperature of the GPF 13 is low and hence, the output temperature stagnates near the dew point temperature until the temperature of the GPF 13 rises after the engine 1 is restarted. As a consequence, the difference between the input temperature and the output temperature at the predetermined integrated air amount Gp increases. Otherwise, the difference between the integrated air amount required to raise the output temperature to the first predetermined temperature T1 and the integrated air amount required to raise the input temperature to the first predetermined temperature T1 becomes large. Otherwise, the difference between the integrated air amount required to raise the input temperature from the second predetermined temperature T2 to the third predetermined temperature T3 and the integrated air amount required to raise the output temperature from the second predetermined temperature T2 to the third predetermined temperature T3 is increased. That is, the presence or absence of the GPF 13 in the exhaust pipe 9 can be determined in a condition where the temperatures of the engine 1 and the exhaust pipe 9 are lowered. In other words, a thermal energy remaining in the engine 1 and the exhaust pipe 9 does not act on the input temperature, and a thermal energy remaining in the GPF 13 does not act on the output temperature. Therefore, it is possible to prevent erroneous determination of the presence or absence of the GPF 13 in the exhaust pipe 9, and to accurately determine the presence or absence of the GPF 13 in the exhaust pipe 9.

In addition, in the above-described control example, the presence or absence of the GPF 13 in the exhaust pipe 9 is determined based on the integrated air amount, that is, the thermal energy inputted to the GPF 13. Therefore, it is unnecessary to set thresholds for determining the presence or absence of the GPF 13 in the exhaust pipe 9 in accordance with the traveling patterns, and it is possible to prevent the relation between the input temperature and the output temperature from changing in accordance with the traveling pattern. Consequently, it is possible to simplify the determination of the presence or absence of the GPF 13.

Further, in the case in which the GPF 13 is arranged in the exhaust pipe 9, it is possible to prevent erroneous determination by determining the presence or absence of the GPF 13 under conditions in which the difference between the input temperature and the output temperature is large. Specifically, the presence or absence of the GPF 13 in the exhaust pipe 9 is determined under the condition where the integrated air amount becomes an amount possible to estimate that the input temperature is equal to or higher than the dew point temperature of moisture and that the output temperature is lower than the dew point temperature of moisture. Therefore, in the case in which the GPF 13 is arranged in the exhaust pipe 9, the input temperature increases relatively rapidly, while the output temperature stagnates below the dew point temperature. As a consequence, the difference between the input temperature and the output temperature becomes remarkably large, and the accuracy for determining the presence or absence of the GPF 13 in the exhaust pipe 9 can be improved.

As shown in FIG. 3A and FIG. 3B, in the case in which the GPF 13 is arranged in the exhaust pipe 9, the input temperature is increased in the situation where the integrated air amount is equal to the predetermined amount G1 or greater, but the output temperature stagnates. On the other hand, in the case in which the GPF 13 is not arranged in the exhaust pipe 9, the input temperature and the output temperature are increased regardless of the integrated air amount. In other words, given that the integrated air amount is equal to or greater than the predetermined amount G1, and that the GPF 13 is arranged in the exhaust pipe 9, the rate of change of the output temperature is smaller than the rate of change of the input temperature, compared to the case in which the GPF 13 is not arranged in the exhaust pipe 9.

Figure 5A:
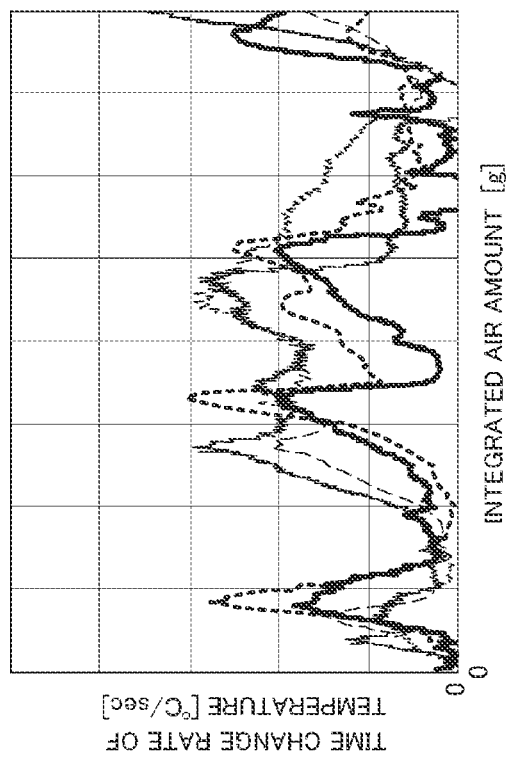

In FIG. 5A, the relationship between the integrated air amount and a time change rate of the input temperature in the case in which the GPF 13 is arranged in the exhaust pipe 9 is indicated by a broken line, and the relationship between the integrated air amount and the time change rate of the output temperature is indicated by a solid line. On the other hand, in FIG. 5B, the relationship between the integrated air amount and a time change rate of the input temperature in the case in which the GPF 13 is not arranged in the exhaust pipe 9 is indicated by a broken line, and the relationship between the integrated air amount and the time change rate of the output temperature is indicated by a solid line. In addition, as in FIGS. 3A and 3B, the verification result in the test pattern according to US06 is represented by a thick curve, and the verification result in the test pattern according to WLTP is represented by a thin curve.

As illustrated in FIG. 5A, in the case in which the GPF 13 is arranged in the exhaust pipe 9, the integrated air amount is equal to or greater than the predetermined amount G1, and the time change rate of the input temperature increases abruptly, while the time change rate of the output temperature is maintained low. As described with reference to FIG. 3A, the output temperature stagnates near the dew point temperature of moisture. Therefore, when the integrated air amount is equal to or greater than the predetermined amount G1, the difference between the time change rate of the input temperature and the time change rate of the output temperature increases.

Figure 5B:
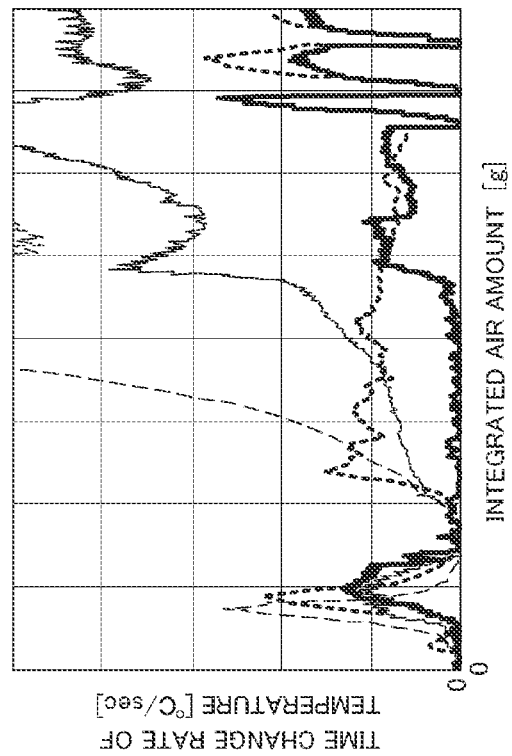

On the other hand, as shown in FIG. 5B, in the case in which the GPF 13 is not arranged in the exhaust pipe 9, the difference between the time change rate of the input temperature and the time change rate of the output temperature increases or decreases regardless of the integrated air amount. That is, there is no significant difference between the time change rate of the input temperature and the time change rate of the output temperature, such as the case in which the GPF 13 is arranged in the exhaust pipe 9.

Therefore, the removal determination device according to the embodiment of the present disclosure may be configured to determine whether or not the difference between the time change rate of the input temperature and the time change rate of the output temperature is equal to or greater than a predetermined difference when the integrated air amount is equal to or greater than the predetermined amount G1, and determine that the GPF 13 is removed when the difference between the time change rate of the input temperature and the time change rate of the output temperature is less than the predetermined difference.

When the vehicle to which the removal determination device according to the embodiment of the present disclosure is applied rapidly accelerates, the input temperature and the output temperature rise in a short time, whereas the input temperature and the output temperature rise in a long time when the vehicle accelerates gradually. Therefore, it is required to determine the thresholds of whether or not the GPF 13 is arranged in the exhaust pipe 9 in accordance with the operating condition of the vehicle, i.e., the operating condition of the engine 1. In the control illustrated in FIG. 2, in order to avoid such complicated control, the presence or absence of the GPF 13 in the exhaust pipe 9 is determined by comparing the input temperature and the output temperature on the precondition that the thermal energy input to the exhaust pipe 9 is equal to a predetermined value or greater.

Figure 6B:
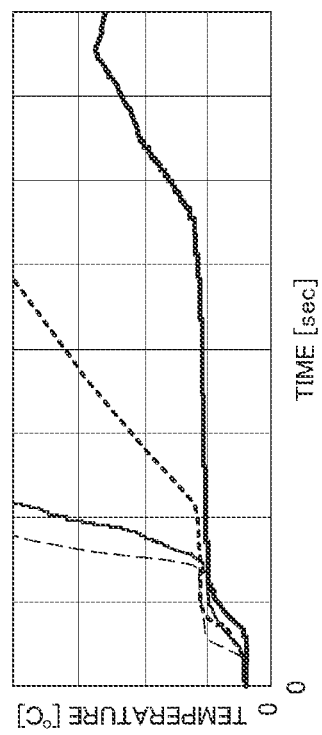
FIGS. 6A and 6B are graphs showing the relationship between: the elapsed time after starting the engine; and the input temperature and the output temperature.
Figure 6A:
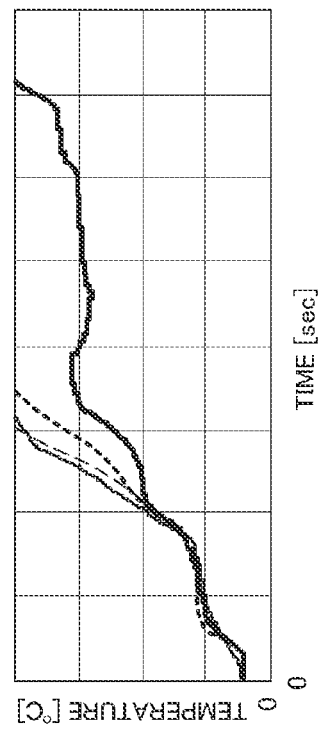

However, as shown in FIG. 6A, in the case in which the GPF 13 is arranged in the exhaust pipe 9, the output temperature rises after a predetermined period of time has elapsed since the start of the engine 1. On the other hand, as shown in FIG. 6B, in the case in which the GPF 13 is not arranged in the exhaust pipe 9, the input temperature and the output temperature rise substantially simultaneously at a time point when a predetermined time has elapsed since the start of the engine 1. Therefore, the removal determination device according to the embodiment may be configured to measure a time difference until the predetermined temperature is reached, or a difference between the input temperature and the output temperature after the predetermined time, and determine the presence or absence of the GPF 13 in the exhaust pipe 9 based on the measured value.

Figure 7:
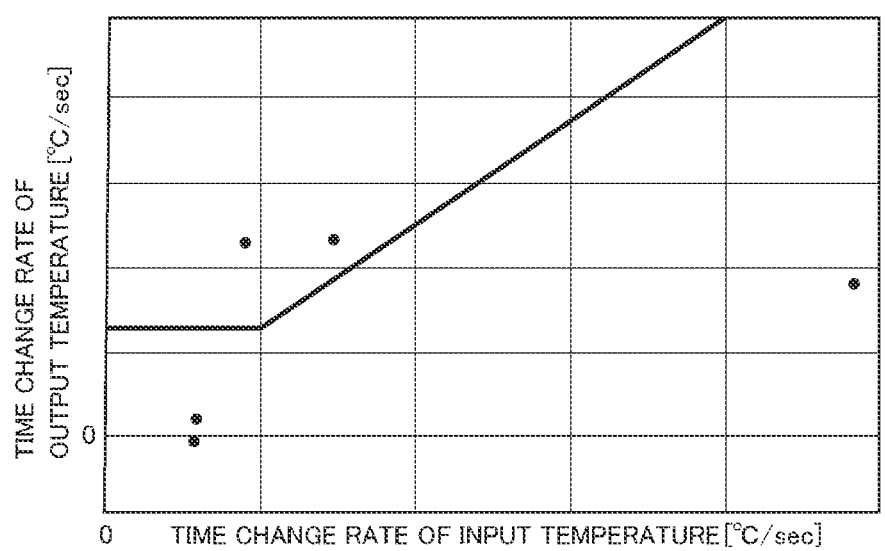
FIG. 7 is a graph for determining the presence of the GPF based on a time rate of change in an output temperature with respect to a time rate of change in an input temperature at a time when an input temperature reaches a predetermined temperature.

Further, the removal determination device according to the embodiment may be configured to determine the presence or absence of the GPF 13 in the exhaust pipe 9 based on the time change rate of the output temperature with respect to the time change rate of the input temperature at the time when the input temperature reaches the predetermined temperature. FIG. 7 shows a result of verifying the relationship between the time change rate of the input temperature and the time change rate of the output temperature at the time when the input temperature reaches the predetermined temperature. The validation is plotted with "●", and a fourth threshold for determining the presence or absence of the GPF 13 in the exhaust pipe 9 are indicated by solid lines. An area above the fourth threshold is an area where it is determined that the GPF 13 is not arranged in the exhaust pipe 9. That is, when a time change rate of the output temperature with respect to the time change rate of the input temperature is equal to or less than a predetermined fourth threshold value, it is determined that the GPF 13 is arranged in the exhaust pipe 9. The predetermined temperature corresponds to the "fourth predetermined temperature" in the embodiment of the present disclosure, and may be set to a value that differs from a value used for determination at step S6.

Thus, by determining the presence or absence of the GPF 13 in the exhaust pipe 9 based on the time change rate of the output temperature with respect to the time change rate of the input temperature at the time when the input temperature reaches the predetermined temperature, it is possible to accurately determine the presence or absence of the GPF 13 in the exhaust pipe 9 regardless of the traveling pattern.

What is claimed is:

1. A removal determination device for an exhaust gas purification device that determines a presence of the exhaust gas purification device in a casing formed on an exhaust pipe of an engine, comprising:
   an input temperature sensor that detects a temperature at an upstream side of the casing;
   an output temperature sensor that detects a temperature at a downstream side of the casing; and
   a controller that determines the presence of the exhaust gas purification device in the casing,
   wherein the controller comprises:
      an engine stop time collector that collects a time from a point at which the engine is stopped to a point at which the engine is started; and
      a determiner that determines the presence of the exhaust gas purification device in the casing based on an input temperature detected by the input temperature sensor and an output temperature detected by the output temperature sensor, in a case that the time from the point at which the engine is stopped to the point at which the engine is started is equal to or longer than a predetermined time, and
   wherein the controller is configured to
      calculate an integrated amount of an exhaust gas from a startup of the engine,
      determine the presence of the exhaust gas purification device in the casing by the determiner when the integrated amount of the exhaust gas is equal to or greater than a predetermined amount,
      obtain a predetermined integrated amount of the exhaust gas at which the input temperature is raised to or higher than a dew point temperature of moisture and the output temperature is decreased lower than the dew point temperature, in a case that the exhaust gas purification device is arranged in the casing, the predetermined amount including the predetermined integrated amount, and
      change an operating condition of the engine when it is determined that the exhaust gas purification device is not in the casing.

2. The removal determination device for the exhaust gas purification device as claimed in claim 1, wherein the controller is configured to determine the presence of the exhaust gas purification device in the casing by the determiner when the input temperature is equal to or higher than a predetermined temperature.

3. The removal determination device for the exhaust gas purification device as claimed in claim 1, wherein the determiner is configured to determine that the exhaust gas purification device is arranged in the casing in a case that a difference between the input temperature and the output temperature at a point when the integrated amount of the exhaust gas from the startup of the engine reaches a first determination value is equal to or greater than a first threshold value.

4. The removal determination device for the exhaust gas purification device as claimed in claim 1, wherein the determiner is configured to determine that the exhaust gas purification device is arranged in the casing, in a case that a time change rate of the output temperature with respect to a time change rate of the input temperature at a point when the input temperature is raised to a fourth predetermined temperature is equal to or less than a fourth threshold value.

5. A removal determination device for an exhaust gas purification device that determines a presence of the exhaust gas purification device in a casing formed on an exhaust pipe of an engine, comprising:
   an input temperature sensor that detects a temperature at an upstream side of the casing;
   an output temperature sensor that detects a temperature at a downstream side of the casing; and
   a controller that determines the presence of the exhaust gas purification device in the casing,
   wherein the controller comprises:
      an engine stop time collector that collects a time from a point at which the engine is stopped to a point at which the engine is started; and
      a determiner that determines the presence of the exhaust gas purification device in the casing based on an input temperature detected by the input temperature sensor and an output temperature detected by the output temperature sensor, in a case that the time from the point at which the engine is stopped to the point at which the engine is started is equal to or longer than a predetermined time,
   wherein the determiner is configured to determine that the exhaust gas purification device is arranged in the casing, in a case that a difference between: an integrated amount of the exhaust gas required to raise the input temperature to a first predetermined temperature from the startup of the engine; and an integrated amount of the exhaust gas required to raise the output temperature to the first predetermined temperature, is equal to or greater than a second threshold value, and
   wherein the controller is configured to change an operating condition of the engine when it is determined that the exhaust gas purification device is not in the casing.

6. A removal determination device for an exhaust gas purification device that determines a presence of the exhaust gas purification device in a casing formed on an exhaust pipe of an engine, comprising:
   an input temperature sensor that detects a temperature at an upstream side of the casing;
   an output temperature sensor that detects a temperature at a downstream side of the casing; and
   a controller that determines the presence of the exhaust gas purification device in the casing,
   wherein the controller comprises:
      an engine stop time collector that collects a time from a point at which the engine is stopped to a point at which the engine is started; and
      a determiner that determines the presence of the exhaust gas purification device in the casing based on an input temperature detected by the input temperature sensor and an output temperature detected by the output temperature sensor, in a case that the time from the point at which the engine is stopped to the point at which the engine is started is equal to or longer than a predetermined time,
   wherein the determiner is configured to determine that the exhaust gas purification device is arranged in the casing, in a case that a difference between: an integrated amount of the exhaust gas required to raise the input temperature from a second predetermined temperature to a third predetermined temperature; and an integrated amount of the exhaust gas required to raise the output temperature from the second predetermined temperature to the third predetermined temperature, is equal to or greater than a third threshold value, and wherein the controller is configured to change an operating condition of the engine when it is determined that the exhaust gas purification device is not in the casing.

* * * * *